United States Patent
Chauzy et al.

(10) Patent No.: US 10,266,422 B2
(45) Date of Patent: Apr. 23, 2019

(54) METHOD FOR CONTINUOUS THERMAL HYDROLYSIS WITH RECIRCULATION OF RECOVERED STEAM

(71) Applicant: VEOLIA WATER SOLUTIONS & TECHNOLOGIES SUPPORT, Saint-Maurice (FR)

(72) Inventors: Julien Chauzy, Antony (FR); Cedric Crampon, Champigny-sur-Marne (FR); Thierry Aupetit, Joinville le Pont (FR); Andrew B. Gilbert, Droitwich (GB)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 382 days.

(21) Appl. No.: 14/916,312

(22) PCT Filed: Jul. 29, 2014

(86) PCT No.: PCT/EP2014/066254
§ 371 (c)(1),
(2) Date: Mar. 3, 2016

(87) PCT Pub. No.: WO2015/032552
PCT Pub. Date: Mar. 12, 2015

(65) Prior Publication Data
US 2016/0214880 A1 Jul. 28, 2016

(30) Foreign Application Priority Data
Sep. 6, 2013 (FR) .................... 13 58591

(51) Int. Cl.
*C02F 1/02* (2006.01)
*C02F 11/12* (2019.01)
(Continued)

(52) U.S. Cl.
CPC .............. *C02F 1/025* (2013.01); *C02F 11/12* (2013.01); *C02F 11/18* (2013.01);
(Continued)

(58) Field of Classification Search
CPC ......... C02F 11/06; C02F 11/08; C02F 11/086; C02F 11/12; C02F 11/18; C02F 2103/32;
(Continued)

(56) References Cited

U.S. PATENT DOCUMENTS

| | | | |
|---|---|---|---|
| 4,983,296 A * | 1/1991 | McMahon | .............. C02F 11/10 210/603 |
| 5,234,469 A | 8/1993 | Khan et al. | |

(Continued)

FOREIGN PATENT DOCUMENTS

| | | | | |
|---|---|---|---|---|
| EP | 2612842 A1 | 7/2013 | | |
| EP | 2774894 A1 * | 9/2014 | .............. | C02F 11/18 |

(Continued)

*Primary Examiner* — Lucas A Stelling
(74) *Attorney, Agent, or Firm* — Coats & Bennett PLLC (57) ABSTRACT

The invention pertains to a method for the continuous thermal hydrolysis of sludge to be treated, containing organic matter, said method comprising the steps of simultaneously carrying out the injection of recovered steam into said sludge and mixing said sludge with said recovered steam by means of a primary dynamic injector-mixer so as to obtain a primary uniform mixture; simultaneously carrying out the injection of fresh steam into said primary uniform mixture and mixing said primary uniform mixture with said fresh steam by means of a secondary dynamic injector-mixer so as to obtain a secondary uniform mixture of sludge; conveying said secondary uniform mixture towards a tube reactor under pressure and prompting an essentially plug-type flow of this secondary uniform mixture into said reactor for a residence time that is sufficient and at a temperature that is sufficient to enable the thermal hydrolysis of the organic matter present in this secondary uniform mixture;

(Continued)

producing said recovery steam within means for the production of recovered steam from said secondary uniform mixture obtained at exit from said tubular reactor; cooling said secondary uniform mixture when it exits said means for producing recovery steam to a temperature enabling the subsequent digestion of the hydrolyzed organic matter that it contains.

22 Claims, 8 Drawing Sheets

(51) Int. Cl.
  *C02F 11/18* (2006.01)
  *C02F 103/32* (2006.01)
(52) U.S. Cl.
  CPC .... *C02F 2103/32* (2013.01); *C02F 2209/001* (2013.01); *C02F 2209/02* (2013.01); *C02F 2209/03* (2013.01); *C02F 2209/44* (2013.01); *C02F 2303/10* (2013.01); *Y02W 10/30* (2015.05)

(58) Field of Classification Search
  CPC ............ C02F 2209/001; C02F 2209/02; C02F 2209/03; C02F 2209/44; C02F 2303/10; C02F 1/025; Y02W 10/30
  See application file for complete search history.

(56) References Cited

U.S. PATENT DOCUMENTS

| | | | |
|---|---|---|---|
| 5,888,307 A | 3/1999 | Solheim | |
| 6,913,700 B2 | 7/2005 | Solheim | |
| 2004/0168990 A1* | 9/2004 | Solheim | C02F 11/18 210/774 |
| 2011/0114570 A1* | 5/2011 | Hojsgaard | C02F 11/18 210/752 |

FOREIGN PATENT DOCUMENTS

| | | | | |
|---|---|---|---|---|
| ES | 2551144 T3 | * | 11/2015 | ............ C02F 11/18 |
| WO | WO 2014135734 A3 | * | 11/2014 | ............ C02F 11/18 |

* cited by examiner

METHOD FOR CONTINUOUS THERMAL HYDROLYSIS WITH RECIRCULATION OF RECOVERED STEAM

This application is a U.S. National Stage Application of PCT Application No. PCT/EP2014/066254, with an international filing date of 29 Jul. 2014. Applicant claims priority based on French Patent Application Nos. 1358591 filed 6 Sep. 2013. The subject matter of these applications is incorporated herein.

1. FIELD OF THE INVENTION

The present invention pertains to a method and a device for the continuous thermal hydrolysis of sludge containing organic matter, which may or may not be mixed with other wastes containing organic matter. This sludge or these wastes can for example be derived from the treatment of domestic wastewater (digested or non-digested cleansing sludge, fats derived from pre-treatment), or from the treatment of industrial wastewater (for example wastewater from the food processing industry, slaughterhouses, molasses, etc.), or home refuse type wastes containing organic matter or derived from discharged matter, grease tanks, etc. The term "sludge" shall be used here below in this document.

2. PRIOR ART

Sludge coming from the treatment of wastewater, whether of domestic or industrial origin or from agriculture, can be treated biologically, especially by anaerobic digestion.

The goal of biological treatment is to degrade the organic matter contained in this sludge. This degradation can be aimed at stabilizing the sludge, enabling the production of energy (through the production of biogas) and/or again reducing the volume of the sludge. However, certain organic compounds are more difficult to degrade by biological means than others and it is known that pre-treatment by thermal hydrolysis accelerates the process of biological degradation. This thermal treatment is generally done under pressure at a temperature of over 100° C., which can in practice go up to 220° C., for a predetermined period of time, generally half an hour. Through such thermal hydrolysis, the organic matter which is poorly biodegradable can be converted into compounds which can then be more easily degraded biologically.

Classically, this subsequent biological degradation can be done by digestion within a closed reactor that operates anaerobically and is called a digester. Such anaerobic digesters can work properly only if they operate at a suitable and constant temperature, generally requiring a heating system and only if they are properly stirred. This stirring is all the easier as the sludge entering the digester is fluid, i.e. it has low viscosity.

There are various types of methods of thermal hydrolysis known in the prior art. Some of them are implemented by the treatment of given quantities of sludge to be hydrolyzed one by one or discontinuously (i.e. "batch" operation) while other methods are designed to enable continuous treatment or at least semi-continuous treatment of the sludge to be hydrolyzed.

In the prior art pertaining to these devices and methods of thermal hydrolysis, we may cite especially the patent documents WO96/09882 and WO2006/027062 which both pertain to batch-treatment methods.

Such batch treatment methods have the drawbacks of making it necessary to manage the treatment cycles for treating the different batches of sludge that have to be treated and requiring repetitive operation of certain apparatuses, such as the opening/closing of valves for example which may lead to premature wear and tear.

The techniques of continuous or semi-continuous thermal hydrolysis of sludge include the techniques described in the patent document EP1198424 and those described in the patent document WO2009/121873.

In the technique described in EP1198424, the sludge is conveyed into a reactor through which it travels for 5 to 60 minutes at a temperature of 130° C. to 180° C. The sludge hydrolyzed through such a treatment is then cooled by a heat exchanger so as to make sure its temperature is low enough to be compatible with the working of a downstream digester and to prevent the biomass of this digester from being destroyed. The energy thus recovered enables the preheating of the sludge before its entry into the thermal hydrolysis reactor. This technique however uses exchangers on non-hydrolyzed concentrated sludge with a dry solids content of more than 10%, which can be difficult to manage in practice, entailing constraints for the user since it requires periods of stoppage for maintenance and cleaning. Besides, this configuration implements a pump, in this case the pump 11 in FIG. 1 of the document EP1198424, working on very hot sludge (130 to 180° C.), and experience shows that this factor causes this pump to have a short service life. Finally, this configuration is limited in terms of concentration of the sludge to be treated since it cannot be used to treat sludge having a dry content of over 20%. It is furthermore not optimized in terms of energy consumption because the sludge is even more concentrated (i.e. with a dry content of over 20% and therefore with a water content of less than 80%), the needs in terms of steam would be further reduced given that the volume of water (contained in the sludge) to be heated with the steam would be reduced.

In the technique described in the patent document WO2009/121873, the sludge is treated continuously in a thermal hydrolysis tube reactor into which the steam is directly injected.

This method has the advantage of being a truly continuous method. However, although the treatment of sludge by thermal hydrolysis has been greatly improved over other methods existing in the market, it still has certain limits.

First of all, if the viscosity of the sludge to be hydrolyzed, introduced into the reactor, is too high, it may prove to be difficult to inject steam into this sludge. In practice, this method can treat sludge having a high dry content. Beyond certain dry content levels, the thermal hydrolysis could prove to be non-optimal, and this would limit the performance of anaerobic digestion situated downstream from the thermal hydrolysis.

Secondly, experiments carried out by the Applicant have shown that the thermal and mechanical constraints observed within the thermal hydrolysis reactor implemented within the framework of the method described in the document WO2009/121873 could necessitate special arrangements in terms of construction. It has been observed that the totality of the steam injected is not totally condensed into the sludge beyond certain dry content levels. In practice, the steam injected into the reactor may take preferred pathways. This problem is also identified in the patent WO2009/121873, especially in paragraph 1 of page 5 of this document which specifies that when the reactor has a horizontal part, the steam and the sludge may tend to get separated into two layers, namely an upper layer containing steam and a lower layer containing sludge.

Now, for all methods of thermal hydrolysis and especially for those methods that work continuously, the critical phase of the method corresponds to the transfer and condensation of steam in the sludge. Indeed, if this step is not done properly, the performance of the method of thermal hydrolysis can be considerably impaired, in terms of chemical reaction as well as in economic terms, since the quantity of steam that has to be used then becomes greater.

The methods of thermal hydrolysis on dewatered sludge therefore come up against the difficulty of having to inject steam into the sludge efficiently and, as a corollary, the difficulty of mixing them when this sludge is too viscous. Since sludge is viscous by nature, the greater its dry content, the more difficult it will be for the steam to be injected into the sludge, get mixed with the sludge and yield its energy by condensation to prompt the thermal hydrolysis of the poorly biodegradable compounds.

In the batch-treatment methods, it is recommended to carry out a stirring operation in the treatment tanks to foster the intimate mixing of the steam with the sludge to be treated. Through such stirred mixing performed in the treatment vessels, the mixture of sludge and steam becomes intimate and the steam can more rapidly yield its energy in getting condensed in the sludge. However, in both the continuous methods and the batch-treatment methods of the prior art, the sludge cannot be efficiently hydrolyzed in practice, at least in the industrial-level transposition that is made of the techniques described and claimed in the patent documents cited here above, once their dry content is greater than 20%. This requires that the sludge be limited to 20% by weight of dry matter.

The patent document WO2009/121873 recommends the use of static or dynamic mixers in the reactor so as to improve the mixing of this steam with the sludge. This is explained in the last paragraph of page 5 of WO2009/121873. Such mixers are especially recommended when the steam is injected into a horizontal part of the reactor, since such a horizontal part is identified, as already indicated here above, as an area in which the steam has a special propensity to take a preferred pathway of discharge and not get completely mixed with the sludge, hence not yield its energy to the sludge properly. This propensity therefore lowers the performance of the thermal hydrolysis reactor. It will be noted however that, to the knowledge of the present Applicant, no industrial-scale device using such dynamic or static mixers for the treatment of sludge has been applied as yet to commercially used installations.

3. GOALS OF THE PRESENT INVENTION

It is a goal of the present invention to propose a method, and a device associated with the application of this method, that can be used in at least one embodiment to improve the performance of the technology disclosed in WO2009/121873 herein considered as the prior art closest to the invention which shall be described here below.

In particular, it is a goal of the present invention to describe a method and a device of this kind that makes it possible in at least one embodiment to treat sludge that is to be hydrolyzed thermally and that has dry content levels higher than the maximum dry content that could hitherto be effectively used in the prior art, without lowering the performance of the digestion that classically follows the thermal hydrolysis of the sludge.

It is a goal of the present invention therefore to propose a method of this kind and a device of this kind that can be used, in at least one embodiment, to obtain homogeneous temperatures of the mixture of sludge and steam within the reactor in order to achieve high performance levels of thermal hydrolysis and to thus remove the mechanical constraints on reactors related to non-homogeneous temperatures.

It is another goal of the invention to provide a technique of this kind that can be used in at least one embodiment to reduce the energy consumption required for its implementation.

In particular, the invention pursues the goal of disclosing a method and a device of this kind that make it possible, in at least one embodiment, to reduce the consumption of steam needed for the hydrolysis of the sludge.

It is yet another goal of the invention to describe a method and a device of this kind which, in at least one embodiment, can implement reactors of smaller volumes, especially of smaller lengths, than in the prior art while at the same time providing for an optimized condensation of the steam in the sludge.

It is yet another goal of the invention to describe a method and a device of this kind which make it possible, in at least one embodiment, to hygienize the sludge.

4. SUMMARY OF THE INVENTION

All or part of these goals are achieved though the invention which pertains, first of all to a method for the continuous thermal hydrolysis of sludge to be treated, containing organic matter, said method comprising the steps of:

simultaneously carrying out the injection of recovered steam into said sludge and mixing said sludge with said recovered steam by means of a primary dynamic injector-mixer so as to obtain a primary uniform mixture of preheated sludge;

simultaneously carrying out the injection of fresh steam into said primary uniform mixture and mixing said primary uniform mixture with said steam by means of a secondary dynamic injector-mixer so as to obtain a uniform secondary mixture of sludge heated to the desired temperature of thermal hydrolysis;

conveying said secondary uniform mixture towards a tube reactor under pressure and prompting an essentially plug type flow of this secondary uniform mixture into said reactor for a residence time that is sufficient and at a temperature that is sufficient to enable the thermal hydrolysis of the organic matter present in this secondary uniform mixture;

producing said recovered steam within means for the production of recovered steam from said secondary uniform mixture obtained at exit from said tube reactor;

cooling said secondary uniform mixture when it exits from said means for producing recovered steam to a temperature enabling the subsequent digestion of the hydrolyzed organic matter that it contains.

It will be noted that, in the present description, the term "dynamic injector-mixer" is understood to mean any mixer constituted by a chamber and by means used to prompt a stirring, through motor-driven mechanical means, of the different phases entering this chamber in order to obtain a uniform mixture at exit. Such elements can, for example, be constituted by blades or screws moved by a rotor or any other means of mixing also moved by a rotor.

The term "plug-type flow" is understood to a mean a flow within which all the particles move at the same speed.

As understood in the invention:
recovered steam is the steam under pressure produced by using the heat of the hydrolyzed sludge when it exits from the reactor;

fresh steam is the steam under pressure produced by means of an ancillary apparatus provided for this purpose, such as for example a boiler, a co-generation system or any other adapted system.

The cooling of the secondary homogeneous mixture is aimed at lowering the temperature. This could for example be obtained by causing it to travel through one or more heat exchangers and/or by diluting it with water and/or fresh sludge. In the case of dilution, the dilution of the sludge will lead to a modification of their dryness as well as a reduction of their temperature.

Thus, the invention proposes to carry out the primary mixing of the recovered steam with the sludge to be hydrolyzed in order to obtain a perfect uniform primary mixture of pre-heated sludge and then to carry out the secondary mixing of fresh steam with the primary mixture in order to obtain a perfect uniform secondary mixture of heated sludge, upstream to the thermal hydrolysis step subsequently carried out in a tube reactor. A step for producing recovered steam from said secondary uniform mixture obtained at exit from said tube reactor is also implemented to supply recovered steam to the primary mixing step.

Thus, according to the invention, the phases of primary and secondary mixing of the sludge with the recovered steam and with the fresh steam are clearly distinct from the thermal hydrolysis phase, the mixing phases and the thermal hydrolysis phase being also carried out efficiently in distinct apparatuses.

The uniform mixture, constituted by the first and second uniform mixtures, carried out prior to the thermal hydrolysis, enables the steam to get condensed in the sludge at the dynamic injector-mixers and thus to heat the sludge. This uniform mixture is then conveyed towards the reactor in which its flow can be as close as possible to the plug flow. Taking the form of a uniform mono-phase liquid phase, it enters the reactor at a uniform temperature, a temperature at which the thermal hydrolysis of the poorly biodegradable compounds can be done in an efficient and optimized way.

Classically, when it exits from the tube reactor, this uniform mixture which contains hydrolyzed organic matter is conveyed if necessary at a temperature and/or a concentration, achieved by dilution if necessary, that enable its subsequent digestion.

Thus the invention is clearly differentiated from the prior art, and especially from the patent document WO2009/121873 by the characteristic according to which the mixture of the sludge to be hydrolyzed with the steam, in this case recovered steam and then fresh steam, is done upstream to the thermal hydrolysis reactor and not within it.

Such an option is a break from the teaching of this prior art, which indicated the possibility of using a static or dynamic mixer integrated into the reactor. This prior art however did not give a mixture homogeneous enough optimize the thermal hydrolysis. The present invention resolves this problem in carrying out this mixing upstream to the reactor so that the phase which enters this reactor is completely homogeneous and so that the energy given by the steam within this mixture can be totally transferred to the sludge so that all the matter that can be thermally hydrolyzed can be hydrolyzed in providing for a sufficient residence time, i.e. a sufficient reactor length.

Through the homogeneity of the mixture of sludge and steam travelling through the reactor, because the totality of the steam has been condensed in the sludge through the efficiency of the dynamic mixer-injector, a homogeneity of temperature of this mixture can be obtained in it. Such a homogeneity of temperature does away with the appearance of preferred pathways for conveying the steam into the reactor and, as a corollary, removes the thermal and mechanical constraints inherent in the appearance of such preferred pathways of flow.

In particular, the perfect uniform mixture of steam and sludge uniformly reduces their viscosity and hence removes the mechanical effects related to the shearing of the sludge.

Obtaining a homogeneous mixture of heated sludge upstream to the reactor, from sludge to be hydrolyzed and from recovered steam and then fresh steam, within the primary and secondary dynamic injector-mixers has the advantage by which it is possible to treat sludge to be hydrolyzed having a high dry content, especially dry content of over 20%.

The application of this technique also helps reduce the quantity of fresh steam needed for the thermal hydrolysis of the sludge. Indeed, the recovered steam produced and injected into the sludge partly replaces the fresh steam injected into the sludge in order to hydrolyze it. It is thus possible to reduce the quantity of energy needed to produce fresh steam and thus make savings in energy consumption.

In addition, the hydrolyzed sludge produced by the application of a method according to the invention most frequently undergoes a subsequent digestion. The implementing of such digestion produces biogas which is used, at least in a large proportion, to feed a boiler or one of the co-generation units in order to produce the fresh steam needed for the thermal hydrolysis of the sludge. The fact, according to the invention, of producing recovered steam and injecting it into the sludge to be hydrolyzed therefore limits the need for fresh steam and therefore reduces the share of formed biogas dedicated to the production of fresh steam for the hydrolysis of the sludge. It is thus possible to produce surplus energy (for example electricity, heat, injection of bio-methane into the network or the like) from this biogas, which could be used for purposes other than that of the hydrolysis of the sludge, or at the very least to increase the quantity of energy produced.

According to a first preferred variant, said step for producing recovered steam comprises:

a step for conveying said secondary uniform mixture when it exits from said tube reactor to the inlet of a heat exchanger;

a step for conveying water to another inlet of said heat exchanger; said secondary uniform mixture transferring at least a part of its heat to said water to indirectly produce said recovered steam.

In this case, the heat from the hydrolyzed sludge is exploited to indirectly produce recovered steam from water injected into a heat exchanger within the hydrolyzed sludge flows. According to this variant, the recovered steam is produced indirectly from the secondary uniform mixture. This implementation produces "clean" recovered steam, i.e. steam that essentially contains no elements such as foams, particles, non-condensable elements or the like, as is the case with flash steam.

According to a second preferred variant, said step for producing recovered steam comprises a step for conveying said secondary uniform mixture when it exits from said tube reactor into a flash reactor within which the pressure and the temperature of said secondary uniform mixture are speedily lowered to produce flash steam, said flash steam constituting said recovered steam.

In this case, the heat from the hydrolyzed sludge is exploited to indirectly produce recovered steam in the form of flash steam which would be mixed with the sludge to be hydrolyzed in the primary injector-mixer in order to increase their temperature: thus, a pre-raising of temperature of the sludge to be treated is obtained. According to this variant, the recovered steam is produced directly from the secondary uniform mixture.

The pressure of said recovered steam ranges from 1 to 10 bar A. It will be noted that in the context of the present description, the pressure unit is the bar absolute (bar A).

The temperature of said recovered steam preferably ranges from 100° C. to 180° C.

The temperature of said sludge conveyed to the inlet of said primary injector-mixer is preferably below 60° C.

The technique according to the invention enables the treatment of relatively fresh sludge, i.e. having a temperature close to the ambient temperature or that of the digested sludge. It is therefore not necessary to pre-heat the sludge upstream, for example by means of an additional heat exchanger. This has an advantage especially for maintenance since the maintenance of the heat exchangers is relatively complicated and costly.

The temperature of said primary uniform mixture at exit from said primary injector-mixer is preferably below 100° C.

According to a preferred variant of the invention, when it exits said secondary injector-mixer, said secondary uniform mixture has a temperature of 100° C. to 200° C. (i.e. the temperature in the reactor enabling the thermal hydrolysis of the organic matter present in said sludge) and a pressure of 1 bar A to 22 bar A.

Advantageously, when it exits said secondary injector-mixer, said secondary uniform mixture has a temperature of 150° C. to 170° C. (i.e. the temperature in the reactor enabling the thermal hydrolysis of the organic matter present in said sludge) and a pressure of 5 bar A to 15 bar A.

According to a preferred variant of the invention, the fresh steam which will be used to obtain the secondary uniform mixture of fresh steam and the primary uniform mixture will have a temperature of 100° C. to 220° C. and a pressure of more than 1 bar A to 23 bar A. In a manner preferred above all, preference will be given to a temperature for this steam ranging from 180° C. to 200° C. and a pressure of 10 bar A to 16 bar A.

The quantity of fresh steam thus provided to the sludge will depend firstly on the dry content of this sludge and secondly on its concentration in organic matter to be hydrolyzed.

The residence time of the secondary uniform mixture within the reactor will be sufficient, as indicated here below, to enable the thermal hydrolysis of the organic matter but, in principle, it will preferably range from 10 minutes to 2 hours and most preferably, from 20 to 40 minutes.

Advantageously, the residence time of said secondary uniform mixture in the reactor will be at least 20 minutes and the temperature of said secondary uniform mixture in the reactor will be at least 100° C. so that the method according to the invention will thus enable the hygienization of said sludge, the totality of this sludge being at the required temperature (>100° C.) for a sufficiently lengthy time. A temperature of over 70° C. for at least 20 minutes applied to the sludge is necessary to hygienize it.

According to a preferred variant of the invention, said step for cooling said secondary uniform mixture downstream to the tube reactor, at a temperature enabling the subsequent digestion of the hydrolyzed organic matter that it contains, comprises at least one dilution with water and/or with fresh sludge, and/or at least one step of heat exchange within at least one heat exchanger. The term "fresh sludge" is understood to mean non-hydrolyzed sludge.

It is thus possible to lower the temperature of the sludge and/or modify its concentration in order to make it compatible (in terms of temperature and/or concentration) with the biological phenomena involved, as the case may, be in the digestion process that follows.

The choice of cooling and/or dilution will be made according to the nature of the hydrolyzed sludge to be digested.

Such dilution could be necessary to enable efficient subsequent digestion of these thermally hydrolyzed sludge. This mixture will then reach a sufficiently low temperature and will be diluted enough to comply with the biology of the digester.

Also preferably, the method according to the invention comprises preliminary steps of dewatering and homogenization of said sludge to be treated in order to convey them to the primary, dynamic injector-mixer, these preliminary steps leading to sludge having a dry content ranging from 15% to 50%, advantageously from 15% to 35%, and even more advantageously from 20% to 35%. It may be recalled that, in practice, the prior-art devices do not enable the efficient hydrolysis of sludge having a dry content of over 20%.

According to one advantageous variant of the method according to the invention, this method comprises a step for adapting the conditions of implementation of the primary dynamic injector-mixer and/or the secondary dynamic injector-mixer to the dryness of the sludge. Thus, when the dynamic injector-mixer or injector-mixers include a blade rotor, the rotational speed of these blades can be modified according to this dry content so as to make it possible to obtain a uniform mixture even when this dryness is high.

According to another aspect of the invention, it also covers any device for implementing a method according to any one of the alternatives explained here above.

According to the invention, such a device comprises:

at least one primary dynamic injector-mixer having a primary uniform mixture outlet;

means for leading in sludge to be treated containing organic matter in said primary dynamic injector-mixer;

means for leading in recovered steam to said primary dynamic injector-mixer;

at least one secondary dynamic injector-mixer having a secondary uniform mixture outlet;

means for leading in said primary uniform mixture into said secondary dynamic injector-mixer;

means for leading in fresh steam into said secondary dynamic injector-mixer;

a tube reactor for thermal hydrolysis;

means for leading in said secondary uniform mixture into said tube reactor for thermal hydrolysis;

means for producing said recovered steam from said secondary uniform mixture obtained at exit from said tube reactor, said means for producing comprising a recovered steam outlet communicating with said means for leading in recovered steam;

means for cooling said secondary uniform mixture coming from said means for producing recovered steam to a temperature enabling the subsequent digestion of the hydrolyzed organic matter that it contains.

Such a device according to the present invention is clearly distinguished from the prior-art disclosed in WO2009/121873 by the characteristic according to which a primary dynamic injector-mixer and a secondary dynamic injector-mixer are provided upstream to the tube reactor for thermal hydrolysis and not integrated into the reactor for thermal hydrolysis. As specified here above, the use of equipment to mix the sludge to be thermally hydrolyzed with steam, namely the dynamic injector-mixers, and of distinct equipment to carry out the thermal hydrolysis of the thermally hydrolysable compounds contained in this sludge, namely a tube reactor, optimizes the working of this tube reactor for thermal hydrolysis. This optimization implies the obtaining of hydrolyzed sludge with a higher content in hydrolyzed compounds easily digestible within a digester and the possibility of giving this tube reactor a lower volume.

Such a device according to the invention therefore enables the treatment by thermal hydrolysis of the sludge in a smaller reactor volume, giving a non-negligible economic advantage as compared with the prior art.

As already specified, it is possible to use different types of dynamic injector-mixers in the context of the application of the present invention. However, the device according to this invention will advantageously be provided with dynamic injector-mixer devices that have a chamber provided with a blade rotor or a screw rotor, the rotational speed of which can be adapted to the dryness of the sludge as indicated here above. It will be noted that the geometry of the blades could itself be adapted to the dryness and the viscosity of the sludge.

The prior art as set forth in the general descriptive part of the patent WO2009/121873 provides for more or less every possible form of tube reactor. However, the embodiments of this technique given in this patent document recommend that this reactor should be made horizontally. According to one embodiment described in this patent document WO2009/121873, an inlet of sludge at one end of the tube reactor is planned with an injection of steam in proximity to this end, an outlet of the hydrolyzed sludge being provided at the other end of this tube reactor, means for injecting cooling water being provided at this second end. In another embodiment described in this patent document WO2009/121873, the tube reactor for thermal hydrolysis has a first vertical part extended by a second longer horizontal part. The reason why each of these preferred embodiments has a relatively long horizontal part stems from the need to put the sludge into contact with the steam for a sufficiently lengthy residence time so that not only does thermal hydrolysis take place but also, prior to this thermal hydrolysis, within the tube reactor, the steam injected at the beginning of the reactor can get condensed in the sludge in order to transfer the energy needed for their hydrolysis to them.

According to the invention, since the injection of steam has taken place upstream to the reactor through the use of dynamic injector-mixers, it is a perfectly mixed uniform mixture that arrives in the reactor so much so that the reactor in question no longer has to play the role of a condenser but only that of a thermal hydrolysis reactor. Its volume can therefore be made smaller than in the prior art. Indeed, in the prior art, the reactor must act both as a condenser and as a reactor, which gives it a greater volume and especially a greater length than in the present invention.

In addition, the heat of the hydrolyzed sludge is exploited at the exit from the tube reactor to produce steam known as recovered steam which will be injected and mixed with the sludge to be treated by means of the primary dynamic injector-mixer placed upstream to the secondary dynamic injector-mixer in which the sludge is mixed with fresh steam under pressure. This reduces the quantity of fresh steam under pressure injected into the sludge to be hydrolyzed and, if necessary, reduces the proportion of biogas produced by the subsequent digestion of the hydrolyzed sludge used for the production of this fresh steam and therefore increases the share of this biogas used for purposes other than that of carrying out the method for hydrolyzing sludge, for example for producing surplus energy such as for example heat or electricity, for injecting bio-methane into the system or the like.

According to a first preferred variant, said means for producing recovered steam comprise at least one heat exchanger comprising an inlet communicating with the outlet of said tube reactor, an inlet of cooling water communicating with means for leading in water, an outlet of recovered steam and an outlet of cooled hydrolyzed sludge.

This indirectly produces cleaner recovered steam, i.e. steam that does not contain any elements such as foam, particles, non-condensable elements or the like, the presence of which can require the use of certain removal means.

According to a second preferred variant, said means for producing recovered steam comprise at least one flash vapor reactor, the inlet of which communicates with the outlet of said tube reactor.

This enables the direct production of recovered steam, in the form of flash steam by making use of the heat of the hydrolyzed sludge without implementing a heat exchanger, which constitutes an advantage especially as regards maintenance.

According to another preferred characteristic, said means for cooling said secondary uniform mixture comprise means for diluting said secondary uniform mixture with water and/or with fresh sludge, and/or means for exchanging heat within at least one heat exchanger.

It is thus possible to lower the temperature of the sludge and/or modify its concentration in order to make them compatible (in terms of temperature and/or concentration) with the biological phenomena involved as the case may be in the digestion that follows.

The choice of the cooling and/or dilution will be done according to the nature of the hydrolyzed sludge to be digested.

According to the invention, the thermal hydrolysis reactors implemented could take various forms. However, according to a preferred variant, the tube reactor for thermal hydrolysis will be vertical and comprise an inlet at its lower end and an outlet at its upper end, or the reverse.

According to another preferred variant, this tube reactor for thermal hydrolysis will have a first vertical portion directly extended by a second vertical portion, the inlet of the reactor being provided at the lower part of said first vertical portion and the outlet of said reactor being provided at the lower part of said second vertical portion.

According to another preferred variant, this tube reactor for thermal hydrolysis will have a first vertical portion directly extended by a second vertical portion, the inlet of the reactor being provided at the upper part of the first vertical portion and the outlet of the reactor being provided at the upper part of said second vertical portion.

It will be noted that in the context of the present description, the term "first vertical portion directly extended by a second vertical portion" is understood to cover the embodiments in which the two vertical parts are connected by a horizontal connection that is not considered to be reaction zone.

According to yet another variant, tube reactor for thermal hydrolysis has a first vertical portion connected to a second vertical portion, the inlet of the reactor being provided at the upper part of said first vertical portion and the outlet of said reactor being provided at the lower part of said second vertical portion or vice versa.

Also advantageously, the device comprises means to maintain the pressure in the tube reactor for thermal hydrolysis, such as for example at least one pump and/or a valve, preferably an eccentric screw pump.

5. LIST OF FIGURES

The invention as well as its different advantages will be more easily understood from the description of embodiments given with reference to the figures in which.

6. DESCRIPTION OF EMBODIMENTS

6.1. General Architecture

Figure 1:
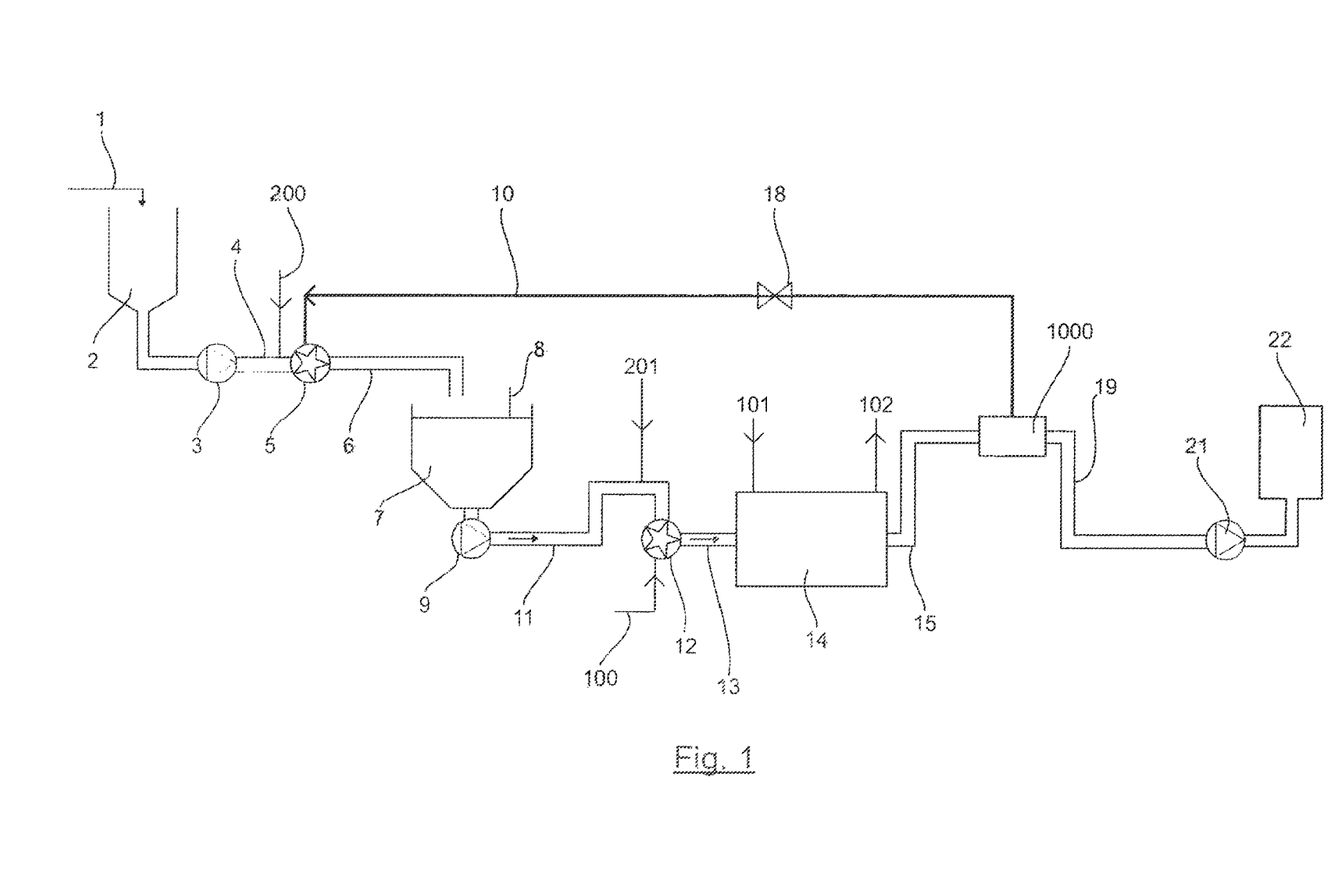
FIG. 1 is a schematic and general view of a device for the thermal hydrolysis of sludge according to the invention, integrated into an installation including a digester provided downstream from this installation, according to which the heat of the hydrolyzed sludge is exploited to produce recovered steam, which is mixed with the sludge to be treated by means of a primary dynamic injector-mixer placed upstream to the secondary dynamic injector in which the sludge is mixed with fresh steam.

Referring to FIG. 1, a device according to the invention is illustrated in a general and schematic way. This device is integrated into an installation including a digester 22 that is not a part as such of the device according to the invention.

Such an installation can be used to carry out a method of lysis-digestion (LD) but it can be noted that it will also be possible to integrate the method according to the invention into a known prior-art configurations known as digestion-lysis (DL) or digestion-lysis-digestion (DLD) configurations, it being known that in the configuration known as the DL configuration, a part of the sludge is hydrolyzed and then returned to the digester.

Referring to FIG. 1, dewatered sludge is conveyed by a pipe 1 to a vessel or hopper 2, provided for example with two worm screws used to homogenize the sludge.

The dewatered and homogenized sludge coming from the hopper 2 is pumped by means of a pump 3 into a pipe 4 serving as means to lead this sludge to a primary dynamic injector-mixer 5. This primary dynamic injector-mixer 5 is also provided with means 10 for injecting recovered steam, the mode of production of which shall be described in greater detail here below. The pressure of this recovered steam will preferably range from 1 to 10 bar A. Its temperature will be preferably range from 100° C. to 180° C. This primary dynamic injector-mixer 5 can also be fed with fresh steam during the starting phases.

The primary dynamic injector-mixer 5 is used to produce a primary uniform mixture of sludge heated by the recovered steam. The temperature of this mixture will preferably be below 100° C.

The primary dynamic injector-mixer 5 could if necessary be cleaned for example by means of an wash water inlet 200 leading into the pipe 4.

The primary uniform mixture coming from the primary dynamic injector-mixer 5 is introduced through a pipe 6 into a buffer vessel 7 in which the non-condensable gases will be recovered and discharged by a conduit 8.

The sludge coming from the buffer vessel 7, in this case the primary uniform mixture, is pumped by means of another feeder pump 9 into a pipe 11 used as means for leading this sludge into the inlet of a secondary dynamic injector-mixer 12.

This secondary dynamic injector-mixer 12 is provided with means 100 for injecting fresh steam generated by a steam generator such as for example a boiler, or any other means for producing steam such as for example a co-generation system not shown in FIG. 1. It can be used to produce a secondary uniform mixture of sludge heated by the fresh steam.

The secondary dynamic injector-mixer could if necessary be cleaned for example by means of a wash water inlet 201 leading into the pipe 11.

At the exit of the secondary dynamic mixer 12, a pipe 13 conveys the secondary uniform mixture made within this pipe 13 to a thermal hydrolysis reactor 14.

The treatment within this thermal hydrolysis reactor 14 is done at a temperature of 150° C. to 170° C., the interior of the reactor being maintained under pressure of 8 bar A to 10 bar A (in this respect, it will be noted that lower temperatures and pressures or higher temperatures and pressures could be implemented depending especially on the dry content of the sludge).

The thermal hydrolysis reactor 14 could if necessary be cleansed by injection of water via an inlet 101 of wash water during the cleansing phases that could be performed when starting up the installation or during the phase of maintenance of this installation, while non-condensable gases if any could be discharged from the reactor via the drain 102.

The sludge hydrolyzed in the thermal hydrolysis reactor 14 is then conveyed by a pipe 15 to a means 1000 for producing recovered steam. These means for producing are used to produce recovered steam from the hydrolyzed secondary uniform mixture coming from the hydrolysis reactor 14, in other words, from the hydrolyzed sludge.

The recovered steam produced through the heat of the hydrolyzed sludge is conveyed into the primary dynamic injector-mixer 5 via the pipe 10 used as a means for injecting recovered steam into this device 5.

A valve 18 or any pressure-reducing element, having a function of maintaining the pressure of the means for producing recovered steam can be placed on the pipe 10.

The hydrolyzed sludge coming from the means 1000 for producing recovered steam is conveyed into a pipe 19 opening into a digester 22. This pipe 19 if necessary has a pump 21 upstream to the digester 22.

The installation has means (not shown) for diluting and/or cooling hydrolyzed sludge coming from the means 1000 for producing recovered steam The hydrolyzed and cooled and/or diluted sludge is conveyed into the digester 22 via the pipe 19.

The thermally hydrolyzed sludge sent to the digester 22 can be easily digested because it has undergone thermal hydrolysis.

It is clearly stated that the depiction in FIG. 1 of an installation incorporating a device according to the invention is a schematic depiction. In particular, the reactor 14 in which the thermal hydrolysis of the uniform mixture of the heated sludge is done could take different shapes. Some of these shapes, among other possible ones, are given with reference to FIGS. 2a, 2b, 3a, 3b, 4a, 4b, 5a, 5b.

Figure 2A:
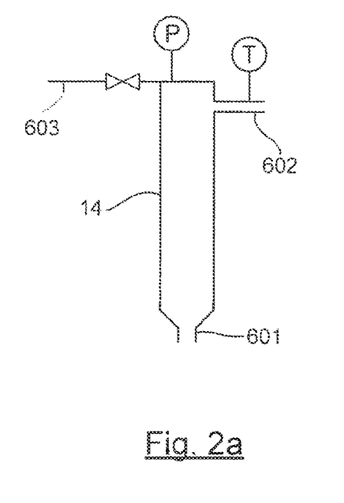
FIGS. 2a and 2b represent two shapes of tube reactors for thermal hydrolysis that can be implemented within the framework of the present invention.

According to FIG. 2a, the thermal hydrolysis reactor 14 has a vertical shape. The reactor 14 is provided in its lower part with an inlet 601 for the uniform mixing of heated sludge with recovered steam and then fresh steam and in its upper part, with an output of the reactor 602. A drain 603 is provided to discharge non-condensable gases if any and means for measuring the pressure P and the temperature T prevailing within the reactor 14 are also provided in the upper part of this reactor.

Figure 2B:
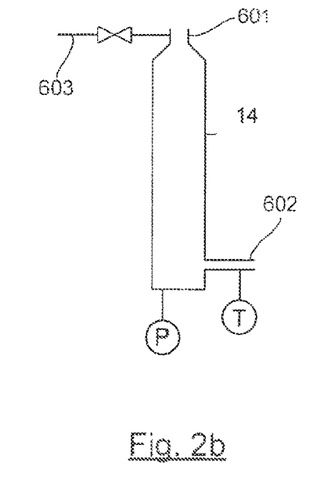

According to FIG. 2b, the thermal hydrolysis reactor 14 has a vertical shape. The reactor 14 is provided in its upper part with an inlet 601 for the uniform mixing of heated sludge with recovered steam and then fresh steam and, in its lower part, with an outlet 602 from the reactor. A drain 603 is provided to discharge non-condensable gases if any in the upper part and means for measuring the pressure P and the temperature T prevailing within the reactor 14 are also provided in the lower part of this reactor Referring to FIG. 3a, the thermal hydrolysis reactor 14 has a first vertical part 704 provided at its lower part with an inlet 701 of a uniform mixture of heated sludge. This first vertical part 704 is directly connected to a second vertical part 705 provided at its lower part with a discharge unit 702 for removing hydrolyzed sludge. A drain 703 is provided at the junction between these two vertical parts to discharge non-condensable gases if any. Means for measuring the pressure P and the temperature T in the reactor 14 are also provided. It can be noted that, in this configuration, the second vertical part 705 is directly connected to the first vertical part 704 without any horizontal part between the two.

Figure 3A:
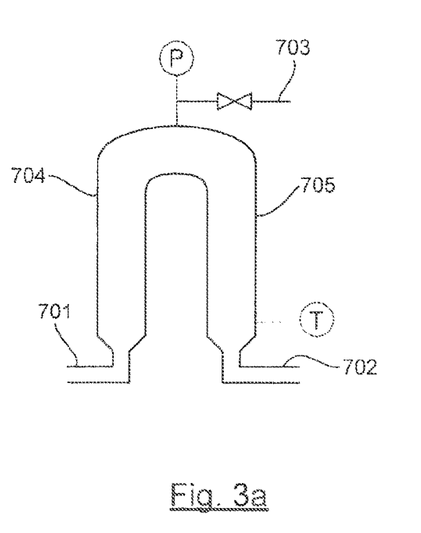
FIGS. 3a and 3b represent two other shapes of tube reactors for thermal hydrolysis that can be implemented within the framework of the present invention.
Figure 3B:
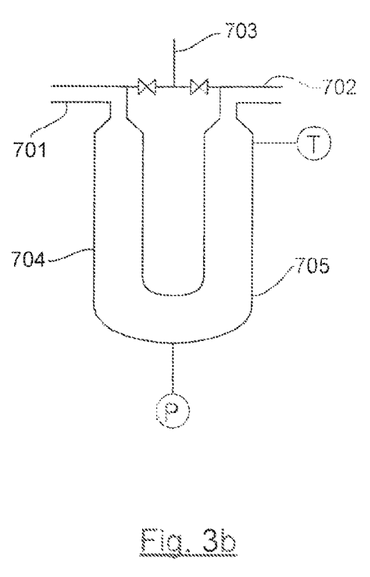

Referring to FIG. 3b, the thermal hydrolysis reactor 14 has a first vertical part 704 provided at its upper part with an inlet 701 of a uniform mixture of heated sludge. This first vertical part 704 is directly connected to a second vertical part 705 provided at its upper part with a discharge unit 702 for removing hydrolyzed sludge. A drain 703 is provided at the junction between these two vertical parts to discharge non-condensable gases if any. Means for measuring the pressure P and the temperature T in the reactor 14 are also provided. It can be noted that, in this configuration, the second vertical part 705 is directly connected to the first vertical part 704 without any horizontal part between the two.

Figure 4A:
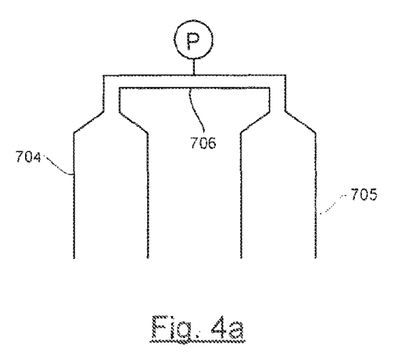
FIGS. 4a and 4b represent two other shapes again of tube reactors for thermal hydrolysis that can be implemented within the framework of the present invention.
Figure 4B:
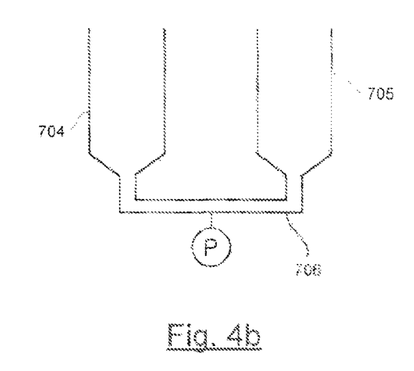

In the variant illustrated in FIG. 4a, the second vertical part 705 and the first vertical part 704 are connected to each other at the upper part by means of a horizontal part 706 between the two. Means for measuring the pressure P and the temperature T in the reactor 14 are also provided.

Figure 5A:
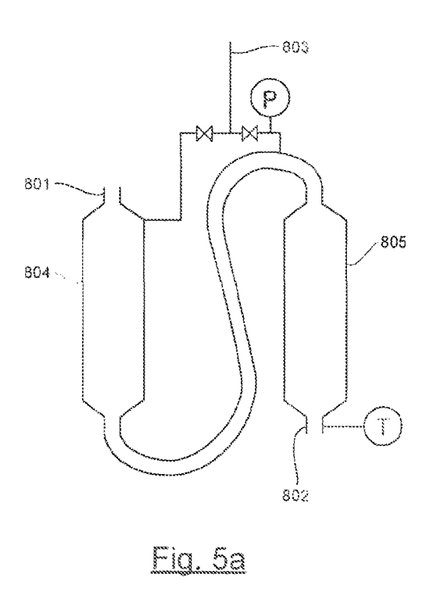
FIGS. 5a and 5b represent two other shapes again of tube reactors for thermal hydrolysis that can be implemented within the framework of the present invention.

Referring to FIG. 5a, the thermal hydrolysis reactor 14 has a first vertical part 804 provided at its upper part with an inlet 801 of a uniform mixture of heated sludge. This first vertical part 804 is directly connected to a second vertical part 805 provided at its lower part with a device 802 for removing hydrolyzed sludge. A drain 803 is provided at the junction between these two vertical parts to remove non-condensable gases if any. Means for measuring the pressure P and the temperature T in the reactor 14 are also provided.

Figure 5B:
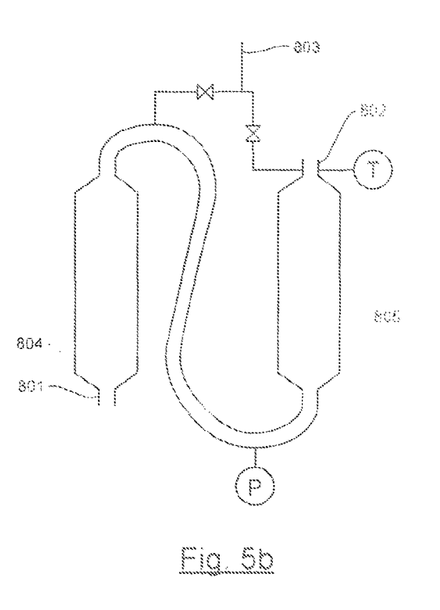

Referring to FIG. 5b, the thermal hydrolysis reactor 14 has a first vertical part 804 provided at its lower part with an inlet 801 of a uniform mixture of heated sludge. This first vertical part 804 is directly connected to a second vertical part 805 provided at its upper part with a device 802 for removing hydrolyzed sludge. A drain 803 is provided at the junction between these two vertical parts to remove non-condensable gases if any. Means for measuring the pressure P and the temperature T in the reactor 14 are also provided.

6.2. Example of a First Embodiment

Heat Exchanger

Figure 6:
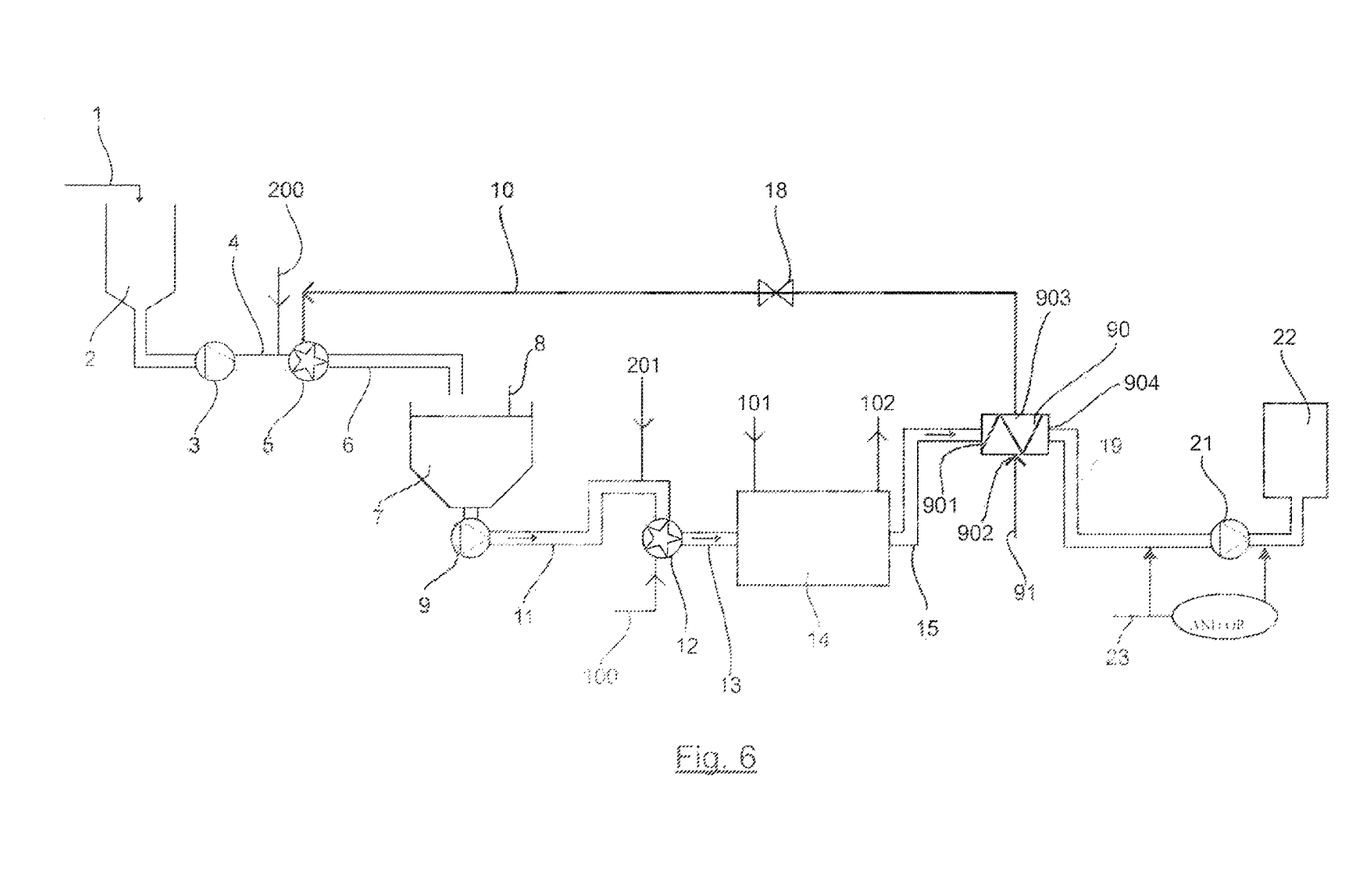
FIG. 6 illustrates a first embodiment of a device according to the invention in which the recovered steam is produced indirectly within a heat exchanger.

Referring to FIG. 6, a schematic description is provided of a device according to a first embodiment of the invention.

Only the differences between the device generally illustrated in FIG. 1 and the device according to this first embodiment illustrated in FIG. 6 are described.

According to this first embodiment, the means 1000 for producing recovered steam comprise a heat exchanger 90.

This heat exchanger 90 comprises a first inlet 901 into which there opens the pipe 15 through which the hydrolyzed sludge coming from the thermal hydrolysis reactor 14 is conveyed into this exchanger 90. It comprises a second inlet 902 to which there are connected means for leading in water, herein comprising a pipe 91. It also comprises a recovered steam outlet 903 to which there is connected the recovered steam injection pipe 10 which opens into the primary dynamic injector-mixer 5. This heat exchanger 90 also comprises an outlet 904 for cooled hydrolyzed sludge.

The outlet 904 for cooled hydrolyzed sludge is connected to a pipe 19 opening into a digester 22.

This pipe 19 possibly has a pump 21 upstream to the digester 22. This pump 21 or any other equivalent pressure-reducing unit such as for example a valve is used to maintain the pressure in the thermal hydrolysis reactor 14.

In this embodiment, the means for diluting and/or cooling comprise conveying means such as one or more pipes 22 for conveying water and/or fresh sludge, opening out upstream and/or downstream to the pump 21.

Figure 7:
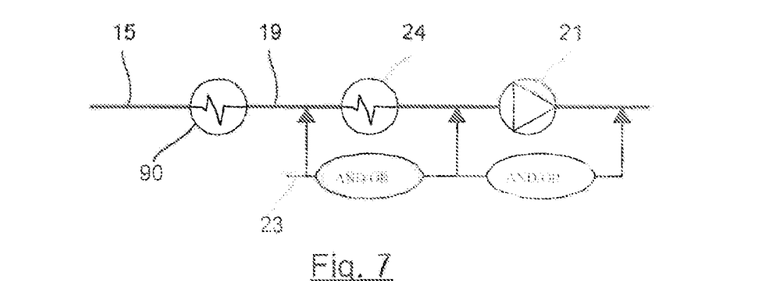
FIGS. 7, 8, 9 and 10 illustrate variants of means for cooling and/or diluting hydrolyzed sludge coming from the hydrolysis reactor of a device according to the first embodiment.

In one variant illustrated in FIG. 7, these means of diluting and/or cooling comprise:
  a heat exchanger 24 placed upstream to the pump 21, and
  leading-in means, such as one or more pipes 23, for leading in water and/or fresh sludge opening out upstream and/or downstream to the heat exchanger 24 and/or the pump 21.

Figure 8:
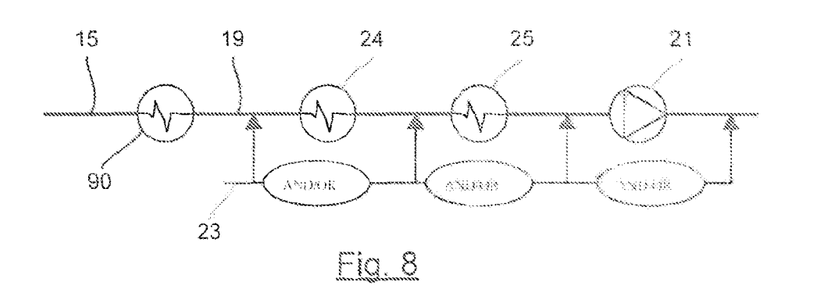

In one variant illustrated in FIG. 8, these means for diluting and/or cooling comprise:

two heat exchangers 24 and 25 placed in series upstream to the pump 21, and leading-in means, such as one or more pipes 23, for leading in water and/or fresh sludge opening out upstream and/or downstream to the first and/or second heat exchangers 24 and 25 and/or the pump 21.

Figure 9:
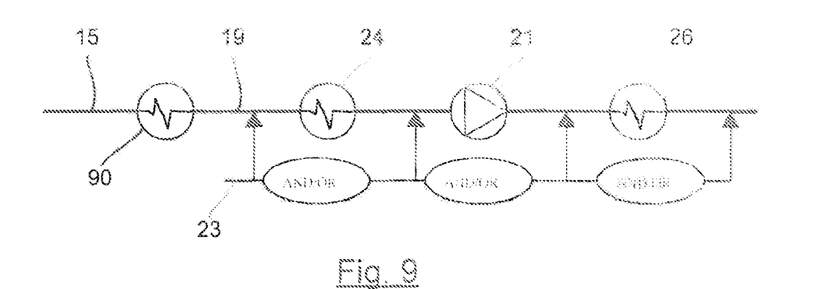

In one variant illustrated in FIG. 9, these means for diluting and/or cooling comprise:

a heat exchanger 24 placed upstream to the pump 21;

a heat exchanger 26 placed downstream to the pump 21, and leading-in means, such as one or more pipes 23, for leading in water and/or fresh sludge, opening out upstream and/or downstream to one or more heat exchangers 24 and 26 and/or the pump 21.

Figure 10:
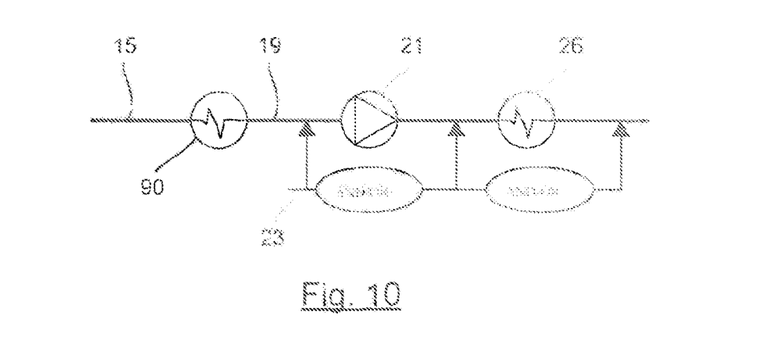

In one variant illustrated in FIG. 10, these means for diluting and/or cooling comprise:

a heat exchanger 26 placed upstream to the pump 21; and leading-in means, such as one or more pipes 23, for leading in water and/or fresh sludge, opening out upstream and/or downstream to one or more heat exchangers 26 and/or the pump 21.

6.3. Example of a Second Embodiment

Flash Reactor

Figure 11:
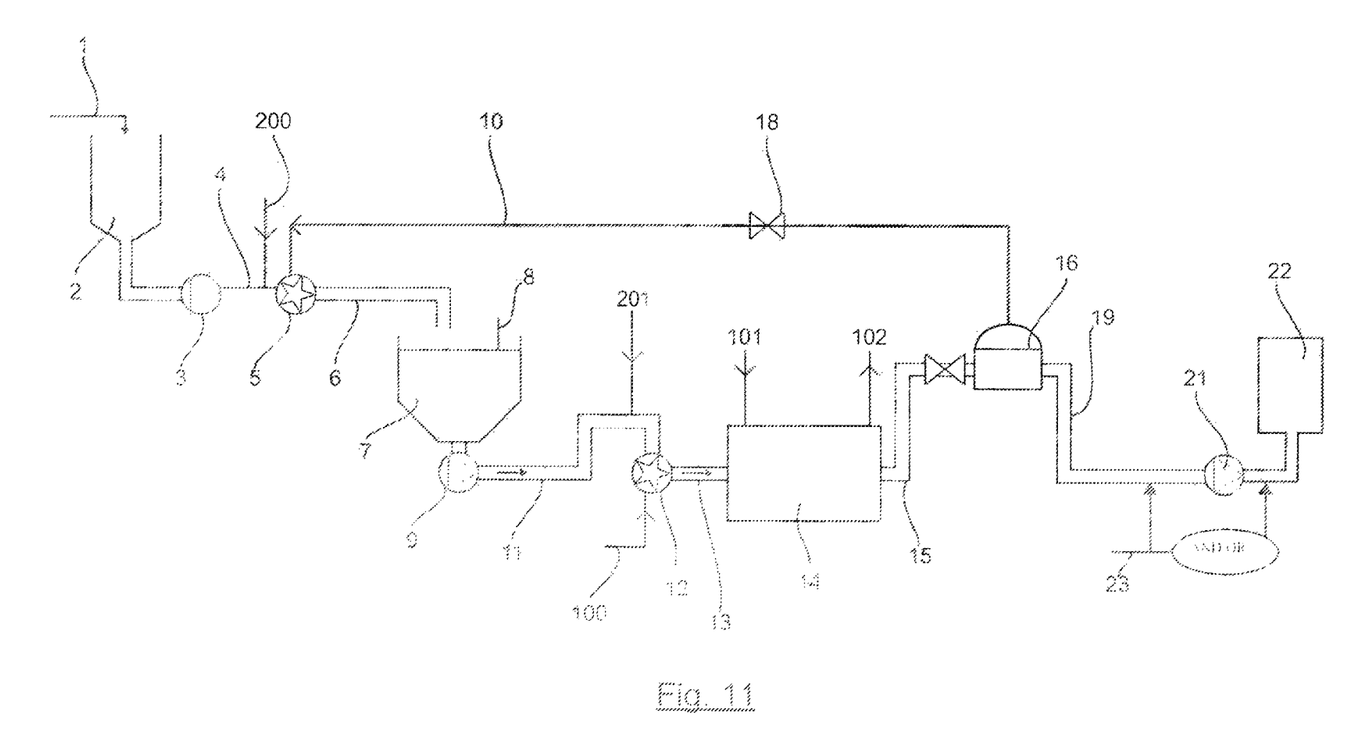
FIG. 11 illustrates a second embodiment of a device according to the invention in which the recovered steam is produced directly within a flash reactor.

Referring to FIG. 11, a schematic description is provided of a device according to a second embodiment of the invention.

Only the differences between the device generally illustrated in FIG. 1 and the device according to this second embodiment illustrated in FIG. 11 are described.

In this embodiment, the recovered steam production means comprise a flash reactor 16.

The pressure and the temperature of the hydrolyzed sludge when exits the reactor 14 are sharply and rapidly lowered within the flash reactor 16 in order to produce flash steam, the pressure of which will preferably range from 1 to 10 bar A and the temperature of which will preferably range from 100 to 180° C.

The flash steam thus produced, which constitutes the recovered steam directly produced from the heat of the hydrolyzed sludge, is conveyed into the primary dynamic injector-mixer 5 via the pipe 10 serving as a means for injecting recovered steam into this pipe.

A valve 18 or any other pressure-reducing element having a function of maintaining the pressure of the flash reactor can be placed on the pipe 10.

A valve 17 or any pressure-reducing element can be placed on the pipe 15 between the outlet of the thermal hydrolysis reactor 14 and the inlet of the flash reactor 16. This valve 17 is used to regulate the pressure of the hydrolyzed sludge circulating in the pipe 15 to maintain the pressure and the temperature in the thermal hydrolysis reactor 14.

The hydrolyzed sludge coming from the flash reactor 16 is conveyed in the pipe 19 opening into the digester 22. This pipe 19 possibly carries a pump 21 upstream to the digester 22.

The installation has a means for diluting and/or cooling hydrolyzed sludge coming from the flash reactor 16.

In this embodiment, these means for diluting and/or cooling comprise leading-in means, such as one or more pipes 23, for leading in water and/or fresh sludge opening out upstream and/or downstream to the pump 21.

Figure 12:
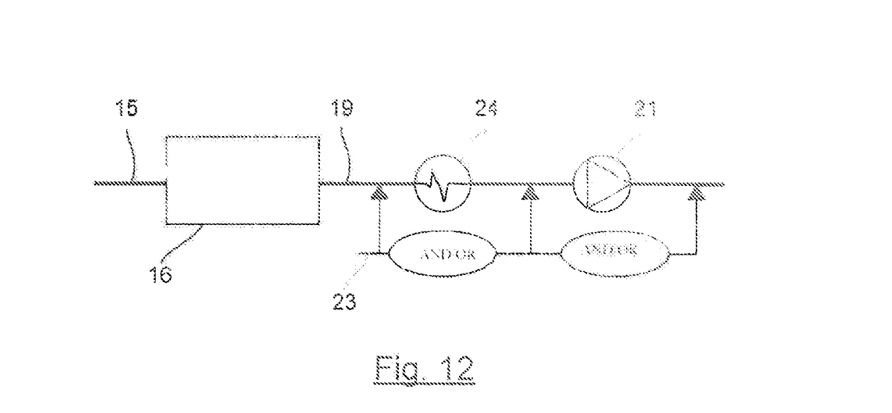
FIGS. 12, 13 and 14 illustrate variants of means for cooling and/or diluting hydrolyzed sludge coming from the hydrolysis reactor according to the second embodiment.

In one variant illustrated in FIG. 12, these means for diluting and/or cooling comprise:

a heat exchanger 24 placed upstream to the pump 21, and leading-in means, such as one or more pipes 23, for leading in water and/or fresh sludge, opening out upstream and/or downstream to the heat exchanger 24 and/or the pump 21.

Figure 13:
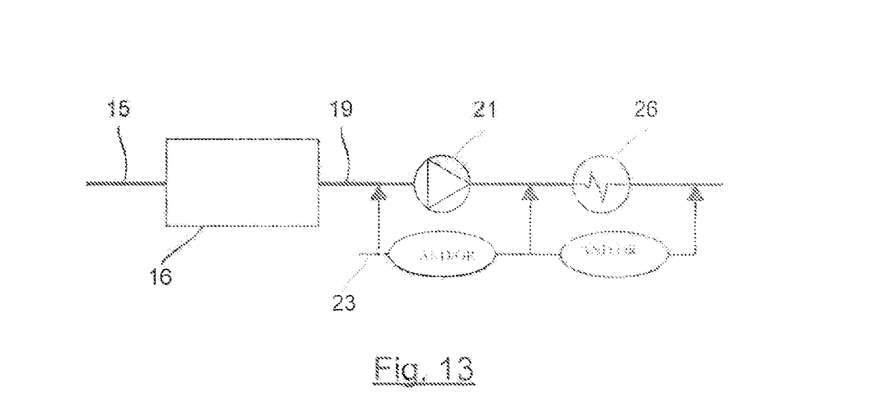

In one variant illustrated in FIG. 13, these means for diluting and/or cooling comprise:

a heat exchanger 25 placed downstream to the pump 21, and leading-in means, such as one or more pipes 23, for leading in water and/or fresh sludge, opening out upstream and/or downstream to the heat exchanger 26 and/or the pump 21.

Figure 14:
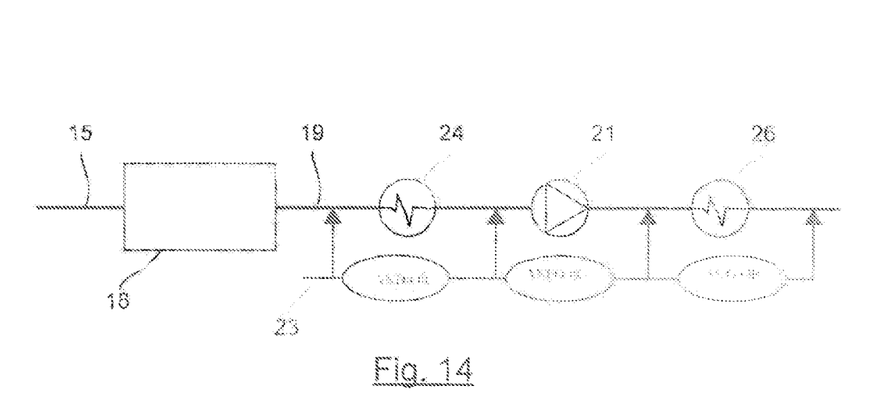

In one variant illustrated in FIG. 14, these means for diluting and/or cooling comprise:

a heat exchanger 24 placed upstream to the pump 21, a heat exchanger 26 placed downstream to the pump 21 and leading-in means, such as one or more pipes 23, for leading in water and/or fresh sludge, opening out upstream and/or downstream to the heat exchangers 24 and 26 and/or the pump 21.

The hydrolyzed and cooled and/or diluted sludge is conveyed into the digester 22 via the pipe 19.

Since they have undergone thermal hydrolysis, the hydrolyzed sludge thermally sent to the digester 22 could be easily digested.

6.4. Trials

Figure 15:
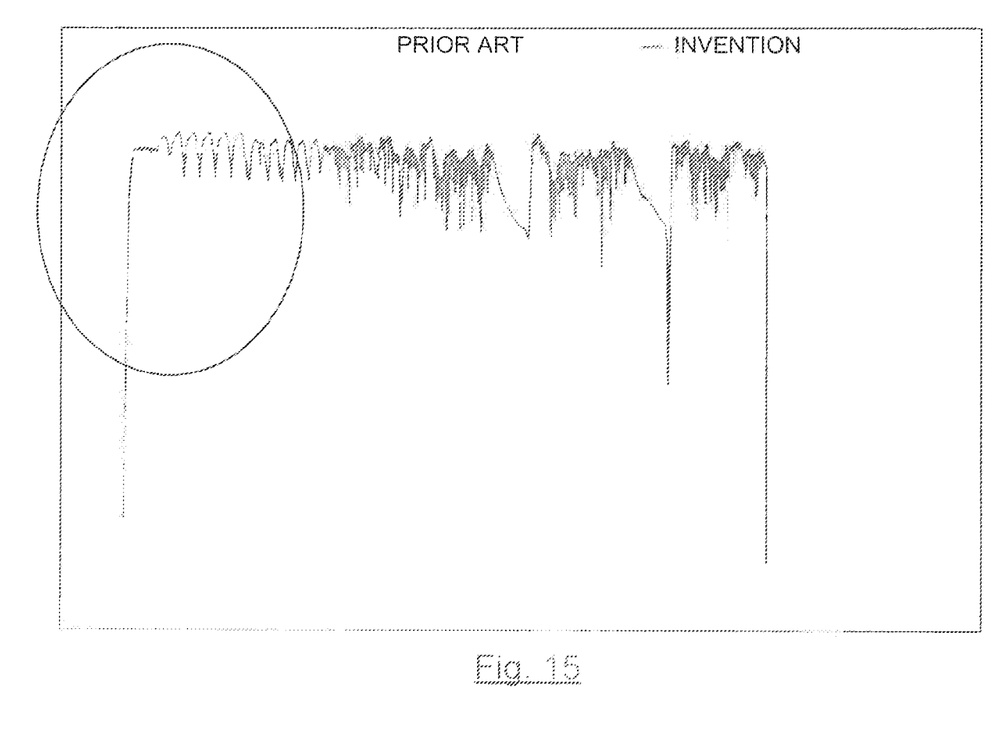
FIG. 15 is a graph showing firstly the progress of the temperature within the tube reactor of a prior-art installation compliant with the patent documents WO2009/121873 that does not integrate any dynamic injector-mixer but in which the steam and the sludge are conveyed to the head of the reactor and secondly the progress of the temperature within the tube reactor of an installation corresponding to the invention integrating a dynamic injector-mixer devices in which the recovered steam and then the fresh steam and the sludge are mixed and then conveyed in the form of a homogeneous mixture to the head of the reactor for thermal hydrolysis.

FIG. 15 shows the progress in time of the temperature prevailing within the thermal hydrolysis reactor:

firstly within the framework of the invention implementing a dynamic injector-mixers provided upstream to the thermal hydrolysis reactor; and, secondly within the framework of an installation similar to that of the prior art in which no dynamic injector-mixer is used, the steam being injected at the base of the reactor.

Referring to this FIG. 15, it can be noted that within the framework of the present invention, the temperature prevailing within the reactor rises gradually until it reaches and stays at the set temperature enabling the optimized thermal lysis of the hydrolysable organic compounds contained in the treated sludge.

In the prior-art installation, the temperature observed in the reactor is, at the very outset, the temperature of the injected steam. This temperature then undergoes major variations. This phenomenon reflects the fact that, in the prior-art technique, there is no systematic occurrence of intimate mixing of the steam with the sludge. On the contrary, the temperature fluctuations observed within the reactor reflect the existence of polyphase flows within this reactor. In the example described here, since the steam is injected at a speed (in practice far greater than 5 m/s) that is far higher than that of the sludge (in practice far below 3 m/s), it finds preferred passageways through the sludge and does not get intimately mixed with the sludge and does not yield its energy efficiently, i.e. a part of the steam is not condensed in the sludge.

Quite on the contrary, through the use of dynamic injectors/mixers according the invention upstream to the hydrolysis reactor, the mixture reaching this reactor is perfectly homogeneous and liquid. It can therefore move in a plug flow in this reactor. The set temperature is preserved throughout the time of residence in the reactor. The energy of the steam is therefore transferred in an optimized way to the sludge and the hydrolysis of the poorly biodegradable compounds can be done efficiently.

It will also be noted that, through the invention, the theoretical quantity of energy used to hydrolyze a given quantity of sludge corresponds more or less to the quantity effectively used to obtain this hydrolysis. In this respect, it will be noted that the computation of the energy needed to increase the temperature of a fluid from a temperature A to a temperature B is easy to obtain. In the context of the trials carried out by the Applicant, the theoretical flow rate of steam computed was 25 kilograms of steam at 13 bar A per hour and the trials showed that it is exactly this flow rate of steam that is effectively needed to efficiently hydrolyze the sludge.

In the context of the prior-art installation, it was shown that the mixing between the sludge to be hydrolyzed and steam was imperfect since the quantity of steam effectively injected to heat the sludge (15 kg/h) was smaller than the theoretically computed quantity (25 kg/h). A certain quantity of steam was therefore not condensed in the sludge. These trials confirm the utility of the present invention.

Finally, it can be noted that the invention can be used to implement reactors having a volume of 20 to 25% less than the prior-art volumes.

6.5. Advantages

The techniques according to the first and second embodiments provides for an optimal hydrolysis of the sludge having a dry content of over 20%.

The requirements in fresh steam for the thermal hydrolysis is all the lower as the temperature of the sludge to be hydrolyzed upstream to the secondary dynamic injector-mixer is high. The proposed mixing of the recovered steams and sludge to be hydrolyzed makes it possible to carry out a pre-raising of temperature of the sludge to be hydrolyzed.

As a consequence, the techniques according to these first and second embodiments of the invention also have the advantage of reducing the quantity of fresh steam needed to carry out thermal hydrolysis and of reducing the energy consumption required for the production of this fresh steam.

Since the hydrolyzed sludge is subsequently digested and since the biogas generated during this digestion is used, in principle, partly to produce fresh steam for the thermal hydrolysis, the other part in excess being used to produce for example electricity, these alternative embodiments enable the use of a greater part of this biogas in excess for the production of surplus energy, for example electrical or thermal energy, that can be used for purposes other than that of thermal hydrolysis.

The invention claimed is:

1. A method for the continuous thermal hydrolysis of sludge to be treated, containing organic matter, said method comprising the steps of:
   dewatering and homogenizing said sludge to obtain sludge having a dry solids content of 20% to 35% by weight of dry matter;
   simultaneously injecting recovered steam into said sludge and mixing said sludge with said recovered steam by a primary dynamic injector-mixer having a chamber and a rotor blade so as to obtain a primary uniform mixture of pre-heated sludge;
   conveying said primary uniform mixture to a secondary dynamic injector-mixer having a chamber and a rotor blade and simultaneously injecting fresh steam into said primary uniform mixture to yield a uniform secondary mixture of sludge heated to a desired temperature for thermal hydrolysis;
   conveying said secondary uniform mixture through a tube reactor under pressure and providing essentially plug-type flow of said secondary uniform mixture in said reactor for a residence time and at a temperature that is sufficient to enable thermal hydrolysis of the organic matter present in this secondary uniform mixture;
   producing said recovered steam from said secondary uniform mixture obtained at an exit from said tube reactor; and
   after producing the recovered steam, cooling said secondary uniform mixture to a temperature enabling the subsequent digestion of the hydrolyzed organic matter contained in said secondary uniform mixture.

2. The method of claim 1, characterized in that said step for producing recovered steam comprises:
   after said secondary uniform mixture exits said tube reactor, conveying said secondary uniform mixture to an inlet of a heat exchanger;
   conveying water to another inlet of said heat exchanger; and
   transferring at least a part of the heat of said secondary uniform mixture to said water to indirectly produce said recovered steam.

3. The method of claim 1, wherein the step for producing recovered steam comprises conveying said secondary uniform mixture from said tube reactor into a flash reactor within which the pressure and temperature of said secondary uniform mixture are lowered to produce flash steam, said flash steam constituting said recovered steam.

4. The method of claim 1, wherein the pressure of said recovered steam ranges from approximately 1 to approximately 10 bar.

5. The method of claim 1, wherein the temperature of said recovered steam ranges from approximately 100° C. to approximately 180° C.

6. The method of claim 1, including maintaining the temperature of said primary uniform mixture exiting from said primary injector-mixer below 100° C.

7. The method of claim 1, including maintaining said secondary uniform mixture exiting said secondary injector-mixture at a temperature of 100° C. to 200° C. and at a pressure of 1 bar to 22 bar.

8. The method of claim 7, including maintaining the temperature and pressure of the fresh steam at a temperature of 100° C. to 220° C. and the pressure of the fresh steam at a pressure of 1 bar to 23 bar.

9. The method of claim 1, including maintaining said secondary uniform mixture exiting said secondary injector-mixer at a temperature of 150° C. to 170° C. and a pressure of 5 bar to 15 bar.

10. The method of claim 1, including maintaining the residence time of said secondary uniform mixture in said reactor for a period of 10 minutes to 2 hours.

11. The method of claim 10, including maintaining the residence time of said secondary uniform mixture in said reactor to at least 20 minutes, and maintaining the temperature of said secondary uniform mixture in said reactor to at least 100° C. so that the hygienization of said sludge contained in said reactor is enabled.

12. The method of claim 1, wherein said step for cooling said secondary uniform mixture comprises diluting said second uniform mixture with water or fresh sludge.

13. The method of claim 1 including dewatering said sludge to obtain sludge having a dry solids content greater than 20% by weight of dry matter.

14. A method of continuously thermally hydrolyzing sludge containing organic matter comprising:
- (a) dewatering the sludge;
- (b) homogenizing sludge;
- (c) after dewatering the sludge and after homogenizing the sludge, directing the sludge into a primary dynamic injector mixer having a chamber and a rotor blade contained therein for mixing;
- (d) recovering steam from a process downstream of the primary dynamic injector mixer and routing the recovered steam upstream;
- (e) directing the recovered steam into the primary dynamic injector mixer and mixing the recovered steam with the sludge to heat the sludge and to form a primary uniform sludge mixture;
- (f) directing the primary uniform sludge mixture into a secondary dynamic injector mixer having a chamber and a rotor blade contained therein for mixing;
- (g) directing fresh steam into the secondary dynamic injector mixer and mixing the fresh steam with the primary uniform steam mixture to form a secondary uniform steam mixture;
- (h) directing the secondary uniform steam mixture into an inlet of a plug flow tube reactor and conveying the secondary uniform sludge mixture continuously through the tube reactor in a plug flow manner and at a temperature and pressure that thermally hydrolyzes the organic matter in the secondary uniform sludge mixture as the secondary uniform sludge mixture flows through the tube reactor;
- (i) after the organic content of the secondary uniform sludge mixture has been thermally hydrolyzed, directing the secondary uniform sludge mixture out an outlet end of the tube reactor;
- (j) after the secondary uniform sludge mixture exits the tube reactor, recovering said recovered steam from the secondary uniform sludge mixture wherein the recovered steam is mixed with the sludge in the primary dynamic injector mixer; and
- (k) cooling said secondary uniform sludge mixture downstream of the tube reactor.

15. The method of claim 14 including directing the primary uniform sludge mixture into a vessel upstream of the secondary dynamic injector mixer and removing non-condensable gases from the primary uniform sludge mixture prior to the primary uniform sludge mixture reaching the secondary dynamic injector mixer.

16. The method of claim 15 wherein after steam has been recovered from the secondary uniform sludge mixture and after the secondary uniform sludge mixture has been cooled, the method includes directing the secondary uniform sludge mixture into a digester and digesting the secondary uniform sludge mixture.

17. The method of claim 14 wherein the tube reactor includes two spaced apart vertical sections connected by an interconnecting line and wherein the method includes removing non-condensable gases from the secondary uniform sludge mixture through a vent operatively connected in the interconnecting line.

18. The method of claim 14 wherein there is provided a flash vaporization tank located downstream of the tube reactor and the method includes directing the secondary uniform sludge mixture from the tube reactor into the flash vaporization tank at a temperature and pressure that results in producing said recovered steam and thereafter routing the recovered steam from the flash vaporization tank upstream and into the primary dynamic injector mixer.

19. The method of claim 14 including sufficiently mixing the fresh steam and the primary uniform sludge mixture in the secondary dynamic injector mixer to yield a homogeneous temperature throughout the secondary uniform sludge mixture and thereby provide an efficient thermal hydrolysis process in the tube reactor.

20. The method of claim 14 including condensing substantially all of the recovered steam in the sludge contained in the primary dynamic injector mixer; and
condensing substantially all of the fresh steam in the primary uniform sludge mixture contained in the secondary dynamic injector mixer.

21. The method of claim 14 wherein the sludge directed into the primary dynamic injector mixer has a dry solids content of over 20% by weight.

22. The method of claim 14 including dewatering said sludge to obtain sludge having a dry solids content greater than 20% by weight of dry matter.

* * * * *